INVENTORS.
LOUIS H. BARNETT
ROBERT U. LANE
BY Parker & Carter
Attorneys.

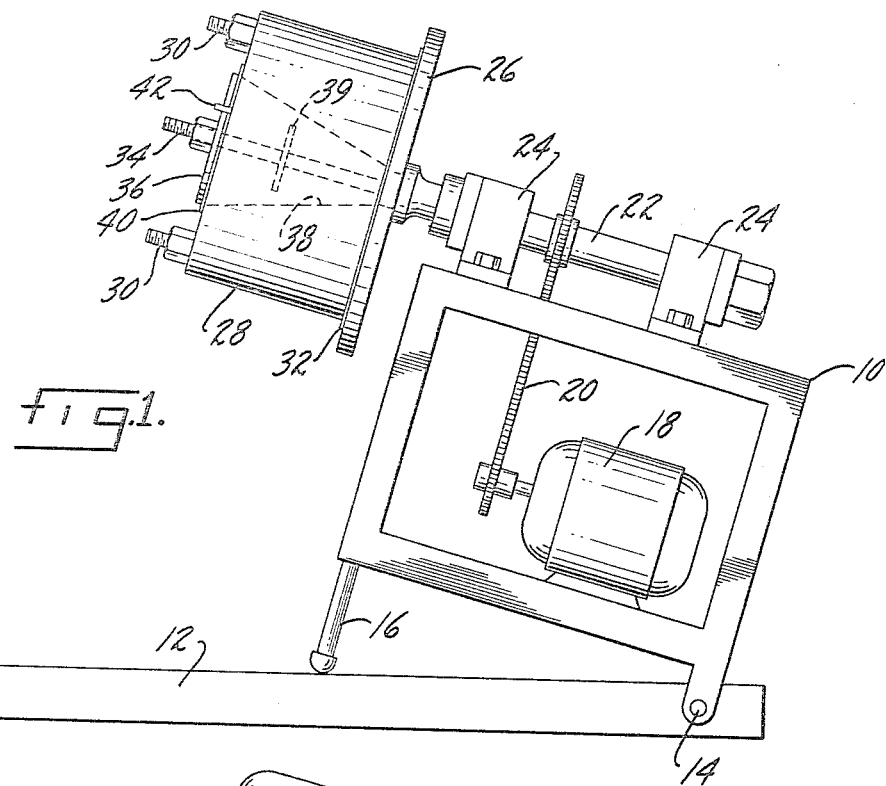
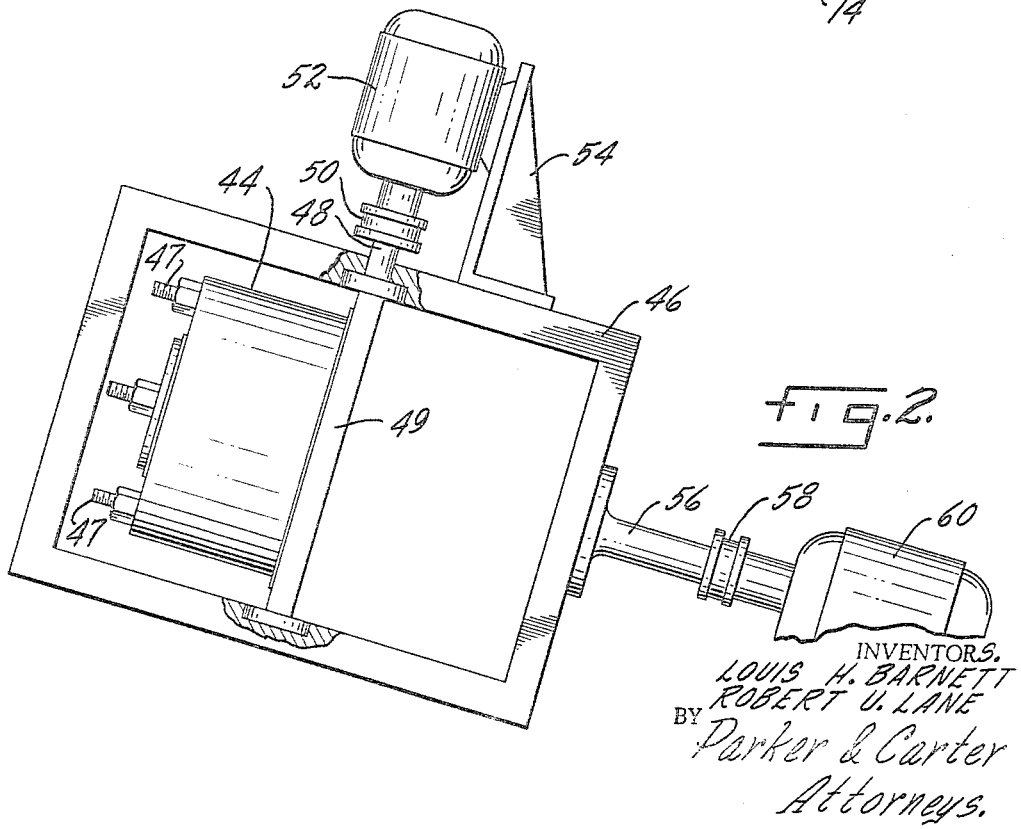

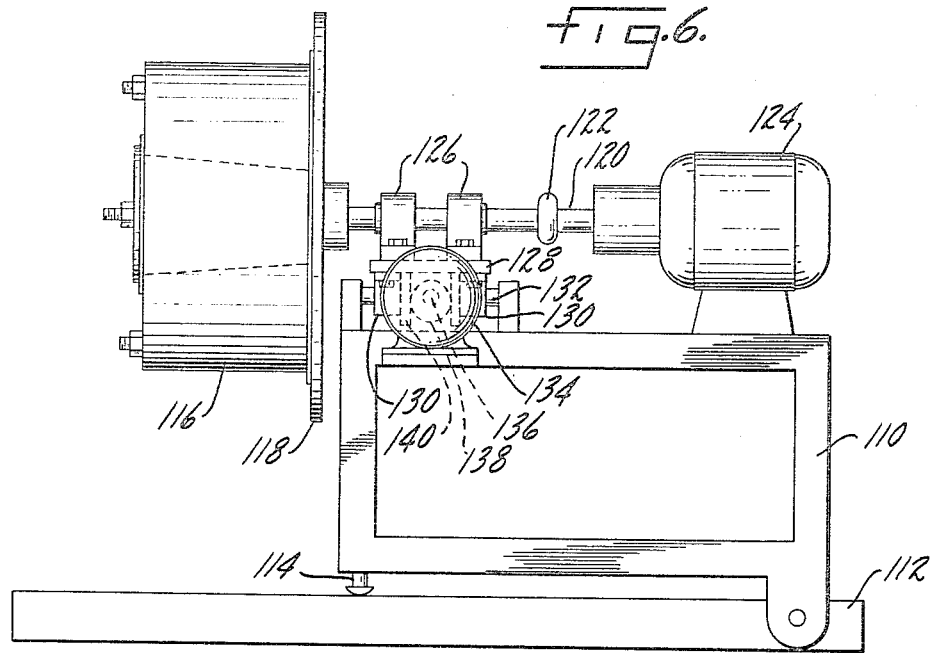
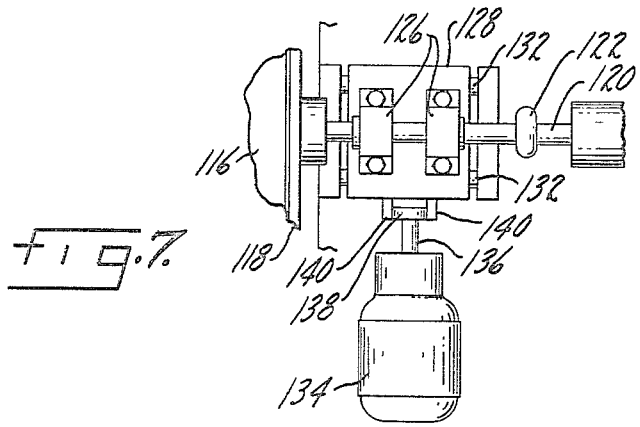

United States Patent Office 3,302,338
Patented Feb. 7, 1967

3,302,338
MOLD POLISHING METHOD
Louis H. Barnett and Robert U. Lane, Fort Worth, Tex., assignors, by mesne assignments, to Loma Industries, Inc., Cleveland, Ohio, a corporation of Ohio
Filed Aug. 31, 1964, Ser. No. 393,437
5 Claims. (Cl. 51—281)

This invention relates to a method of finishing mold parts and/or die components for use in forming molded pieces, for example of plastic, metal or the like, or any vessel or part that requires polish or buff, and is a continuation-in-part of application Serial No. 370,899, filed May 28, 1964, now abandoned.

A primary purpose of the invention is a method of the type described in which the mold parts are given a predetermined desired finish or microfinish.

Another purpose is a method of the type described in which an abrasive or burnishing medium is positioned within a confined area, one portion of which is formed by the mold part, be it core, cavity or other component, cyclical movement of the confined area being effective to finish or polish the surface of the mold part.

Another purpose is a method of the type described in which the mold part is moved in at least two planes.

Another purpose is a method of microfinishing a mold part in which a finishing medium is caused to move against the surface to be finished, movement of the finishing medium preferably being in at least two different planes.

Another purpose is a method of the type described in which movement in one plane is rotary and movement in a second plane oscillatory or cyclical.

Other purposes will appear in the ensuing specification, drawings and claims.

The invention is illustrated diagrammatically in the following drawings wherein:

FIGURE 1 is a diagrammatic illustration of one apparatus for practicing the method described;

FIGURE 2 is a diagrammatic illustration of a second form of apparatus for practicing the method;

FIGURE 6 is a diagrammatic illustration of still a further form of apparatus; and FIGURE 7 is a top view of the apparatus shown in FIGURE 6.

Figure 3:
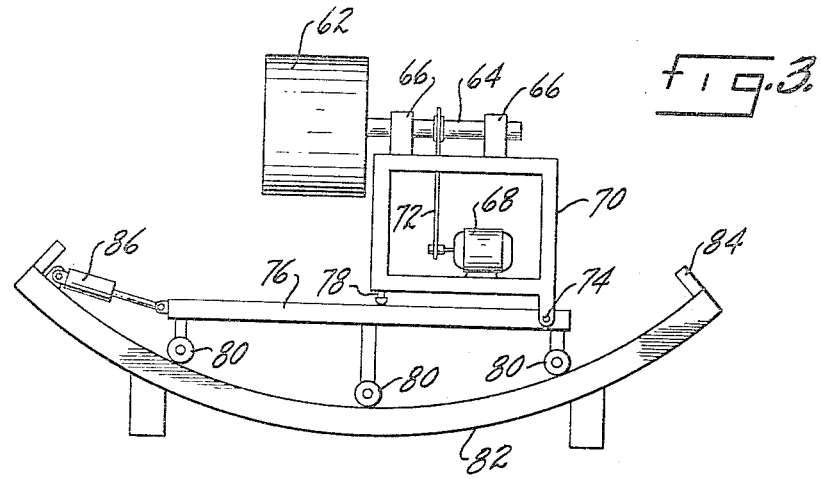
FIGURE 3 is a diagrammatic illustration of a modified form of apparatus.

It has been the practice in the plastics industry and related industries to hand polish mold parts for use in forming various articles. This is true in injection molding, transfer molding, compression molding, or any other form of molding plastic and like materials, for example, rubber, thermoplastic or thermosetting materials. Hand polishing is expensive, time consuming and not always accurate.

A microfinish or micropolish can be obtained on the surfaces of mold parts which will be used in forming molded pieces by placing a polishing or finishing medium within a closed area with a portion of that closed area being formed by the surface to be finished. Continuous movement of the confined area, for example in a circular path or in a cyclical manner or reciprocating manner is effective to give a microfinish or polish on the surface of the mold part. The degree of polish or finish will vary with the metal forming the mold part but more particularly will vary with the finishing or polishing medium. In fact, various media are used in succession with each medium providing a finer degree or condition of finish.

The polishing or finishing medium normally contains an abrasive or burnishing material and a vehicle, for example, a liquid. The combination of these materials when moving against or relative to the surface to be finished will impart a high degree of polish. Examples of abrasive or burnishing materials are abrasive stones or pellets, diamond dust, pumices, woods, cork, inorganic materials, steel balls, steel needles, walnut and pecan shells, lead shot in various shapes, and glass beads. This list is not all inclusive but merely illustrates the wide variety of abrasive and burnishing materials which can be utilized in the method disclosed. Water, various chemical additives, for example acid and/or alkaline solutions, organic products, fine hard abrasive particles, inorganic products, kerosene and similar petroleum solvents, detergents, diamond compounds, soaps, waxes and emulsions are all satisfactory as vehicles, if a vehicle is required.

The speed with which the polishing or finishing medium is moved against the mold part will depend on the vehicle or compound and the abrasive material carried by the vehicle but more particularly by the size and shape of the part to be finished. If the mold part has many irregular areas, small cavities and the like, it is necessary to slow the rotational motion of the confined area so that the polishing medium will reach all portions of the area to be finished, and increase the speed of the linear or rocking action. The correct surface feet per minute rate of the abrasive across the face to be polished is important to maintain optimum polishing action. Directional flow of the abrasives can also be controlled as described herein. Set out below is a typical mold polishing sequence.

*Step #1*

Media—aluminum oxide triangle size #4
Compound—#10 carbo fast mixed 3 lbs. with 1 gal. water
Polishing time—57 hours

*Step #2*

Media—aluminum oxide size #AL5
Compound—#23 carbo polish (3 oz.) mixed with 1 gal. water
Polishing time—4 hours

*Step #3*

Media—aluminum oxide size AL5
Compound—3 ozs. #41 carbocolor mixed with 1 gal. water
Polishing time—2 hours

*Step #4*

Media—#6 carbo brite
Compound—3 ozs. #41 carbocolor mixed with 1 gal. water
Polishing time—2 hours Considering FIGURE 1, a frame 10 may be pivotally mounted on spaced rails 12. The frame 10 pivots about hinge points 14 and a hydraulic jack or the like 16 may be used to raise and lower the frame. A variable speed motor 18 is mounted on the frame 10 and has a chain drive or the like 20 which drives a shaft 22 mounted at the top side of the frame. Bearings 24, fastened to the frame 10, mount shaft 22 for rotation. The invention should not be limited to the drive arrangement shown and many other drive mechanisms may be equally satisfactory. The type of drive is not important.

A clamp plate 26 is mounted on the end of shaft 22. A mold indicated at 28 is fixed to the clamp plate 26 by bolts or the like 30 which extend through the mold and into the clamp plate. A sealing gasket or the like 32 may seal the opposing surfaces of the mold and clamp plate. A center bolt 34 mounts a seal plate 36 which closes the central open area 38 of the mold 28.

A sealing gasket 40 may be used to completely seal the interior area 38 of the mold. A small plug or the like 42 may be positioned in the seal plate 36 and is used to provide an opening for insertion of the polishing medium into the mold cavity 38. It is advantageous to place a baffle plate or the like 39 within the mold cavity 38 to agitate the polishing medium and thus provide additional finishing action. The plate 39 may be mounted on bolt 34. Breaker plates or baffle plates of many different sizes and configurations may be used to agitate and direct the polishing medium. For example, tapered vanes, dish vanes, curved vanes and the like all perform specific functions.

The apparatus of FIGURE 1 is effective to rotate the mold 28 with the mold being somewhat inclined to the horizontal so that the polishing or finishing medium will contact all portions of the mold cavity surface. The rotation of the mold will cause the polishing medium to move against the surface of the mold cavity and to provide a predetermined finish, depending upon the type of medium. The apparatus in FIGURE 1 can be operated at any angle relative to the horizontal and with minor changes this apparatus can be made to rotate the mold about a generally vertical axis. The invention should not be limited to rotating a mold about a particular axis.

In FIGURE 2, a mold indicated generally at 44, which may be enclosed in the same manner as described in connection with FIGURE 1, is fixed to a frame 46 through bolts 47 and a clamp plate 49. A shaft 48 is fixed to the clamp plate 49 and is driven through a suitable coupling 50 by a variable speed motor 52. The motor 52 may be mounted by a bracket or the like 54 extending outwardly from the frame 46. Attached to one side of the frame 46 is a second shaft 56 which may be driven through a coupling 58 by a second drive motor 60. Motor 60 will rotate the frame 46 about one axis whereas motor 52 will rotate the clamp plate 49 about a second axis. As shown herein, the axes are mutually perpendicular, but this is not necessary. Suitable slip rings or other electrical connections may be used to provide motor 52 with electric power.

FIGURE 3 illustrates an apparatus for providing movement of the mold in two different planes with movement in one plane being rotary and in the other plane being oscillatory. A mold 62 which may be mounted in the same manner as shown in FIGURES 1 and 2, is driven from a shaft 64 journaled in bearings 66. A drive motor 68 is mounted on a frame 70 and there may be a chain drive or the like 72 from motor 68 to shaft 64. Frame 70 is pivotally mounted, as at 74, to rails 76. A hydraulic jack or the like 78 may be used to vary the angle of inclination of the frame 70 relative to the rails. The rails 76 may be mounted on rollers 80 which are movable on a curved track 82. There is a safety stop 84 at one end of the track and a piston and cylinder assembly 86 at the other end of the track. The piston and cylinder assembly 86 is effective to reciprocate rails 76 and hence the mold 62 back and forth on track 82. The mold will move in an oscillating manner with the path of oscillation being generally arcuate or curved.

Figure 4:
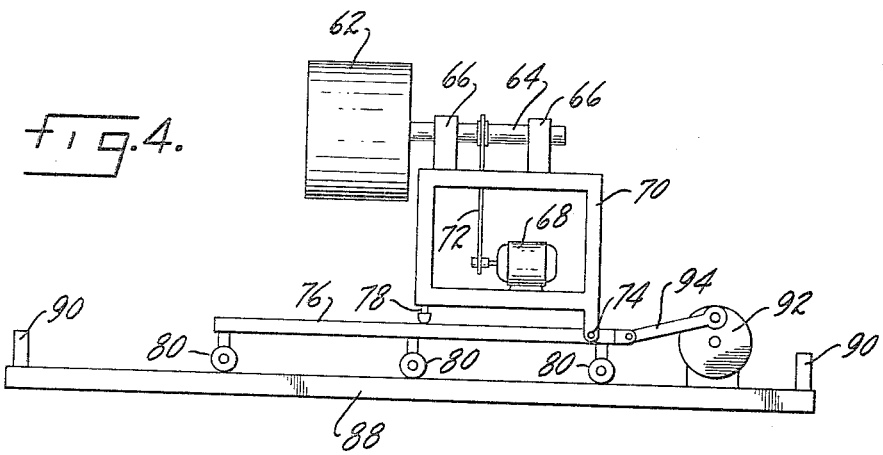
FIGURE 4 is a diagrammatic illustration of yet a further form of apparatus.

FIGURE 4 illustrates an apparatus substantially similar to that shown in FIGURE 3 with the exception that the track is straight, not curved. Track 88 has safety stops 90 at each end and rails 76 supporting the frame 70 and mold 62 are reciprocated by a crankshaft 92 through a crank arm 94. Crankshaft 92 may be rotated by any conventional drive motor with rotation of the crankshaft being effective, through arm 94, to reciprocate rails 76 and the rotating mold 62.

Figure 5:
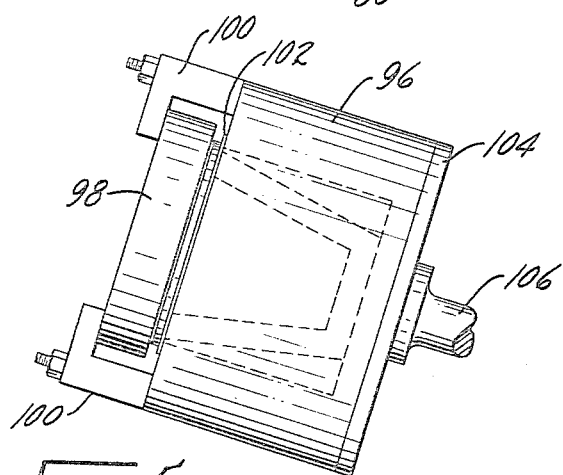
FIGURE 5 is a side view of an assembly for holding a male mold part.

FIGURE 5 illustrates an encapsulation box 96 which is used to hold a male mold 98. Clamps or the like 100 fix the mold to the box 96 and there may be a sealing gasket 102 between opposing surfaces of the mold and the box 96. The box 96 may be mounted on or may be integral with a clamp plate 104, similar to the clamp plate 26 illustrated in FIGURE 1, and there may be a drive shaft 106 secured to the clamp plate. The structure shown in FIGURE 5 provides for polishing the external surfaces of a male mold, the outline of which is illustrated in dotted lines. This structure can be utilized in any of the apparatuses illustrated in FIGURES 1–4. A breaker plate may be included in the area between the mold and the box 96, if desired.

In FIGURES 6 and 7, a frame 110 is pivotally mounted on rails 112 with a jack 114 being used to tilt or adjust the angle of the frame. A mold 116, as in FIGURE 1, is fastened to a clamp plate 118 with the clamp plate being driven from a shaft 120 which is connected through a coupling 122 to a variable speed drive motor 124. Shaft 120 is supported in radial thrust bearings 126 which are fastened on a plate 128. Linear bearings 130, mounted on shaft 132, support plate 128. A second variable speed drive motor 134 has an output shaft 136 driving a cam 138. Cam 138, through a pair of cam bearing plates 140, is effective to cause linear movement of plate 128, bearings 126 and shaft 120. The linear movement of shaft 120 can be compensated for in coupling 122 so that there will be no wear or damage to motor 124. The mold 116 will be rotated by motor 124 and it will be reciprocated or moved back and forth in a linear direction by motor 134 through cam 138 and plates 140.

The use, operation and function of the invention are as follows:

A polishing or finishing medium of a suitable type, such as described herein, is placed within a confined area, a portion of which is formed by the part to be finished. The mold part is then moved in a cyclical manner such that the polishing or finishing medium will grind or burnish the surface to the required finish after various compounds and media changes. In the case of molds for use in making plastic articles, a finish of 10 R.M.S. is usually satisfactory. Such a finish would approximate a mirror finish. The term R.M.S. is common in the mold art and is used to described the average finish of the surface of a given area with this designation meaning the "root mean square" is average. After polishing or finishing the surface may be plated for example with chrome or nickel, then repolished by use of appropriate compounds and media. The length and time during which the polishing medium is applied will depend upon the desired degree of finish as well as the type of burnishing compound (or abrasive material) used in the medium. Different degrees of finish may be obtained by using different abrasive materials applied for different time periods with variations of compounds.

The mold part may be rotated in a single plane, for example as illustrated in FIGURE 1, or it may be rotated in two planes as illustrated in FIGURE 2. There may be rotation in one plane and reciprocation or oscillating movement in a second plane as in FIGURES 6 and 7. What is necessary is to provide continuous relative movement between the surface to be finished and the polishing medium. It is important that all portions of the surface to be finished are contacted. In this connection, the rotary motion may be slowed, for example from three to five r.p.m., while the oscillationg movement is at a speed of several hundred cycles per minute. In such a case the rotary motion is used as a means for positioning the polishing medium about the periphery of the mold part while the required surface feet per minute speed of the abrasive to impart a grinding action is generated by the rocking vibratory action of the mold.

The breaker plate or baffle surface is important to agitate the polishing medium and to provide additional contact between it and the surface to be finished. The baffle surface can provide a control function as it may direct the media at certain areas to be finished.

Whereas the preferred forms of the invention have been shown and described herein, it should be realizd that there are many modifications, alterations and substitutions thereto within the scope of the following claims.

We claim:
1. A method of providing a microfinish on the surface of mold parts which will be used in forming molded pieces, including the steps of placing a finishing medium within a confined area with a portion of the area being formed by the surface to be finished, moving the confined area with the finishing medium inside in two different planes and at a speed dependent upon the shape of the surface to be finished such that the finishing medium moves against the surface to be finished, movement in one plane being rotary and movement in the other plane being cyclical, providing agitation to the finishing medium from within the confined area and maintaining said movement until the desired degree of microfinish has been given to the surface to be finished.
2. The method of claim 1 further characterized in that said finishing medium includes an abrasive material and a vehicle for the abrasive material.
3. The method of claim 1 further characterized in that said cyclical movement is linear.
4. The method of claim 1 further characterized in that said cyclical movement is arcuate.
5. The method of claim 1 further characterized by and including the steps of placing a series of finishing media in said confined area, with the confined area being moved for a given period of time for each medium, successive media being graduated in their finishing properties.

References Cited by the Examiner
UNITED STATES PATENTS

| | | | |
|---|---|---|---|
| 578,969 | 3/1897 | Coates | 51—2 |
| 789,710 | 5/1905 | Blechschmidt | 51—2 |
| 1,143,268 | 6/1915 | Henderson | 51—164 X |
| 1,155,150 | 9/1915 | Henderson | 51—164 X |
| 1,706,877 | 3/1929 | Fabens | 51—2 |
| 1,776,143 | 9/1930 | Brown | 51—164 |
| 1,913,979 | 6/1933 | Farrington | 51—164 X |
| 2,318,580 | 5/1943 | Balz | 51—315 |
| 3,187,474 | 6/1965 | Setzler | 51—313 |

LESTER M. SWINGLE, *Primary Examiner.*